(12) United States Patent
Lee et al.

(10) Patent No.: US 9,775,144 B2
(45) Date of Patent: Sep. 26, 2017

(54) METHOD FOR TERMINAL RECEIVING DOWNLINK SIGNAL IN WIRELESS COMMUNICATION SYSTEM AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR); Hakseong Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 212 days.

(21) Appl. No.: 14/375,760

(22) PCT Filed: Feb. 27, 2013

(86) PCT No.: PCT/KR2013/001578
§ 371 (c)(1),
(2) Date: Jul. 30, 2014

(87) PCT Pub. No.: WO2013/129837
PCT Pub. Date: Sep. 6, 2013

(65) Prior Publication Data
US 2015/0016371 A1   Jan. 15, 2015

Related U.S. Application Data

(60) Provisional application No. 61/604,533, filed on Feb. 29, 2012, provisional application No. 61/673,716, filed on Jul. 19, 2012.

(51) Int. Cl.
*H04W 72/04* (2009.01)
*H04J 11/00* (2006.01)
(Continued)

(52) U.S. Cl.
CPC ....... *H04W 72/042* (2013.01); *H04J 11/0053* (2013.01); *H04L 5/0035* (2013.01);
(Continued)

(58) Field of Classification Search
None
See application file for complete search history.

(56) References Cited

U.S. PATENT DOCUMENTS

2005/0249164 A1* 11/2005 Kwak ............... H04W 72/1289
370/335
2010/0260151 A1   10/2010 Onggosanusi et al.
(Continued)

FOREIGN PATENT DOCUMENTS

CN   102076031   5/2011
CN   102149099   8/2011
(Continued)

OTHER PUBLICATIONS

PCT International Application No. PCT/KR2013/001578, Written Opinion of the International Searching Authority dated Jun. 26, 2013, 13 pages.
(Continued)

*Primary Examiner* — Marcus R Smith
*Assistant Examiner* — Ayanah George
(74) *Attorney, Agent, or Firm* — Lee Hong Degerman Kang Waimey

(57) ABSTRACT

The present invention relates to a method for receiving a downlink signal in a wireless communication system and an apparatus for same. More specifically, a method for a terminal receiving the downlink signal in the wireless communication system supporting a coordinated multi-point (CoMP) action comprises the steps of: receiving from a serving cell which operates according to a first uplink-downlink setting monitoring information with respect to an
(Continued)

adjacent cell which operates according to a second uplink-downlink setting; and detecting control information of the adjacent cell based on the monitoring information, wherein the first uplink-downlink setting and/or the second uplink-downlink setting is a setting established by changing a portion of a wireless resource according to a specific predetermined uplink-downlink setting.

11 Claims, 12 Drawing Sheets

(51) Int. Cl.
*H04L 5/14* (2006.01)
*H04B 7/024* (2017.01)
*H04L 5/00* (2006.01)

(52) U.S. Cl.
CPC .......... *H04L 5/0048* (2013.01); *H04L 5/0092* (2013.01); *H04L 5/1469* (2013.01); *H04B 7/024* (2013.01); *H04L 5/001* (2013.01); *H04L 5/005* (2013.01); *H04L 5/0023* (2013.01)

(56) References Cited

U.S. PATENT DOCUMENTS

| | | | |
|---|---|---|---|
| 2011/0090854 A1 | 4/2011 | Montojo et al. | |
| 2011/0098054 A1* | 4/2011 | Gorokhov | H04B 7/024 455/452.1 |
| 2011/0170516 A1 | 7/2011 | Hu et al. | |
| 2011/0310830 A1* | 12/2011 | Wu | H04W 72/1289 370/329 |
| 2012/0038521 A1* | 2/2012 | Zhu | H04B 17/318 343/703 |
| 2012/0281573 A1* | 11/2012 | Kazmi | H04W 8/26 370/252 |
| 2013/0003663 A1* | 1/2013 | Blankenship | H04L 5/0053 370/329 |
| 2013/0044727 A1* | 2/2013 | Nory | H04L 5/0092 370/330 |

FOREIGN PATENT DOCUMENTS

| | | |
|---|---|---|
| CN | 102215534 | 10/2011 |
| KR | 10-2010-0126101 | 12/2010 |
| KR | 10-2011-0007064 | 1/2011 |
| KR | 10-2011-0135863 | 12/2011 |

OTHER PUBLICATIONS

PCT International Application No. PCT/KR2013/001578, Written Opinion of the International Seraching Authority dated Jun. 26, 2013, 1 page.

State Intellectual Property Office of the People's Republic of China Application Serial No. 201380011501.3, Office Action dated Oct. 10, 2016 7 pages.

\* cited by examiner

FIG. 2
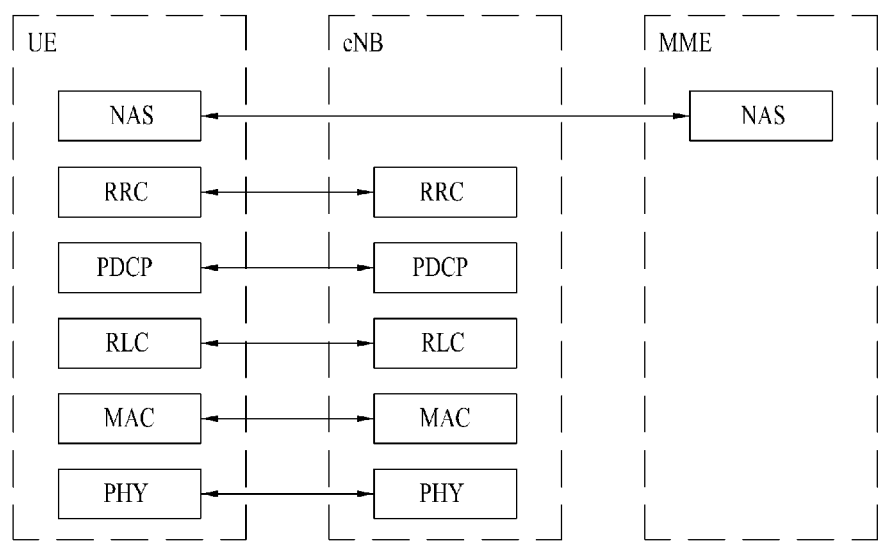
(a) Control-Plane Protocol Stack
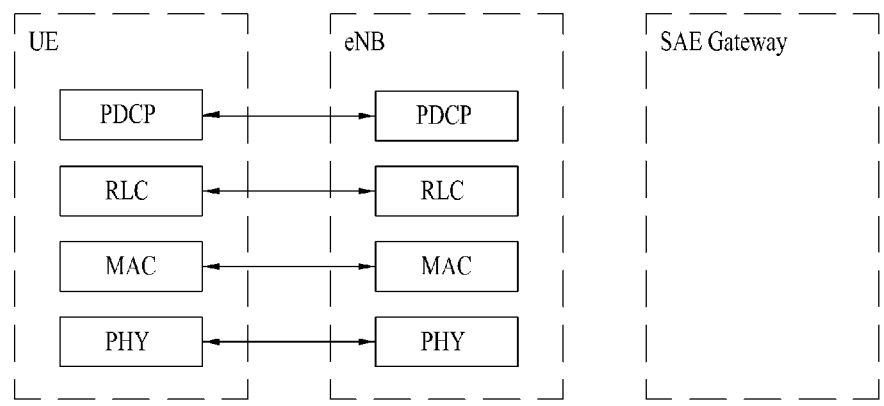
(b) User-Plane Protocol Stack FIG. 10
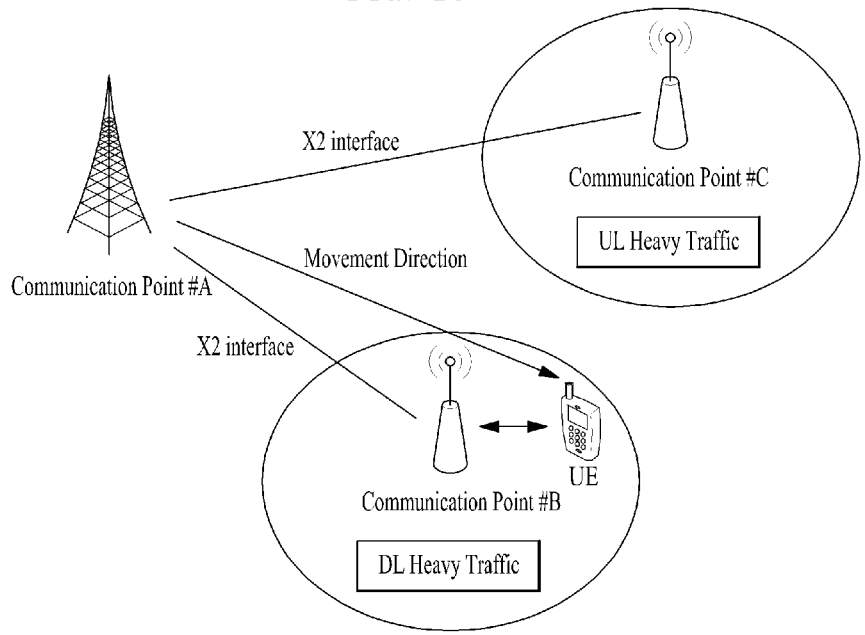
(a) Communication with communication point #B of DL heavy traffic state
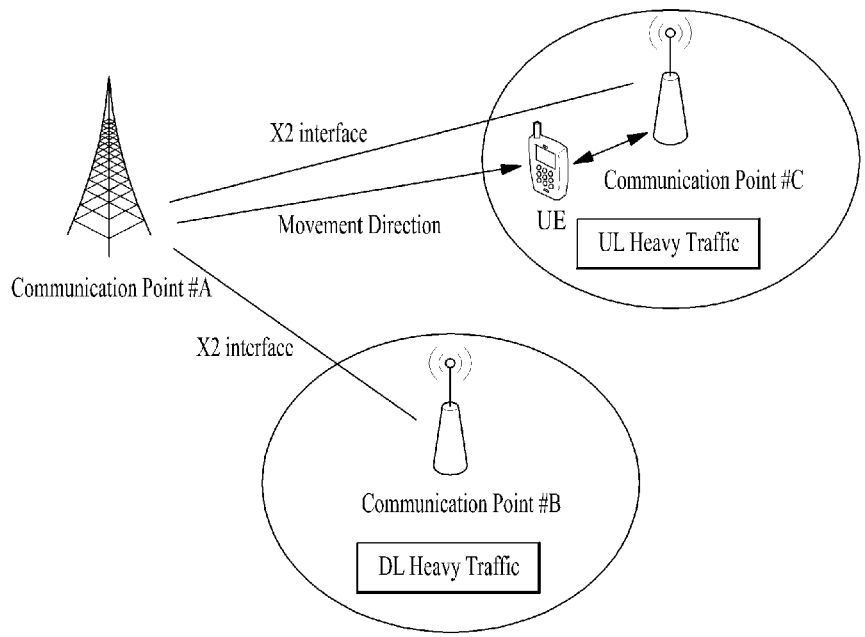
(b) Communication with communication point #C of UL heavy traffic state

METHOD FOR TERMINAL RECEIVING DOWNLINK SIGNAL IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2013/001578, filed on Feb. 27, 2013, which claims the benefit of U.S. Provisional Application Ser. Nos. 61/604,533, filed on Feb. 29, 2012, and 61/673,716, filed on Jul. 19, 2012, the contents of which are all hereby incorporated by reference herein in their entirety.

TECHNICAL FIELD

The present invention relates to a wireless communication system and, more particularly, to a method for a UE to receive a downlink signal from an eNB and an apparatus therefor.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DISCLOSURE

Technical Problem

An object of the present invention is to provide a method for a UE to receive a downlink signal in a wireless communication system and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention for achieving the present invention, provided herein is a method for receiving a downlink signal by a user equipment in a wireless communication system supporting coordinated multi-point transmission and reception (CoMP), including receiving monitoring information about a neighboring cell operating according to a second uplink (UL)-downlink (DL) configuration from a serving cell operating according to a first UL-DL configuration; and detecting control information of the neighboring cell based on the monitoring information, wherein at least one of the first UL-DL configuration and the second UL-DL configuration is obtained by changing part of radio resources according to a predetermined specific UL-DL configuration.

The monitoring information may be information about timing at which the neighboring cell transmits a DL signal The monitoring information may be information about timing at which DL communication is simultaneously configured for the serving cell and the neighboring cell The monitoring information may be information about a cell-specific reference signals rate matching (CRS-RM) pattern configured for the neighboring cell.

The monitoring information may be resource region information for enhanced physical downlink control channels (EPDCCHs) configured in a serving cell and a neighboring cell performing CoMP. The control information may be detected by monitoring only a resource region for the EPDCCH configured for the neighboring cell or monitoring all of resource regions for the EPDCCHs configured for the serving cell and the neighboring cell The neighboring cell may be a cell having a minimum pathloss value for the user equipment.

The neighboring cell may be a cell having a highest reference signal received power for the user equipment.

In another aspect of the present invention for achieving the present invention, provided herein is a user equipment for receiving a downlink signal in a wireless communication system supporting coordinated multi-point transmission and reception (CoMP), including: a radio frequency (RF) unit; and a processor, wherein the processor is configured to receive monitoring information about a neighboring cell operating according to a second uplink (UL)-downlink (DL) configuration from a serving cell operating according to a first UL-DL configuration and detect control information of the neighboring cell based on the monitoring information, and at least one of the first UL-DL configuration and the second UL-DL configuration is obtained by changing part of radio resources according to a predetermined specific UL-DL configuration.

Advantageous Effects

According to the present invention, a UE can efficiently receive a DL signal when a plurality of cells performing a coordinated multi-point transmission and reception (CoMP) operation dynamically changes a radio resource.

The effects that can be achieved through the present invention are not limited to what has been particularly described hereinabove and other advantages not described herein will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

FIG. 2 illustrates structures of a control plane and a user plane of a radio interface protocol between a UE and an E-UTRAN based on the 3GPP radio access network specification.

FIG. 10 is a diagram referred to for explaining problems when a UE performs communication with cells to dynamically change a radio resource according to a system traffic state.

BEST MODE

Figure 1:
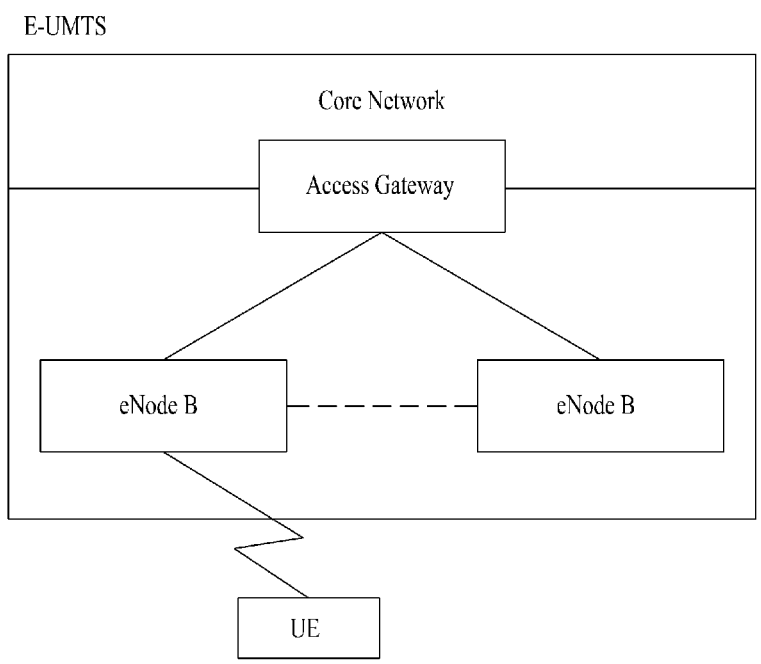
FIG. 1 illustrates a network structure of an E-UMTS as an exemplary radio communication system.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
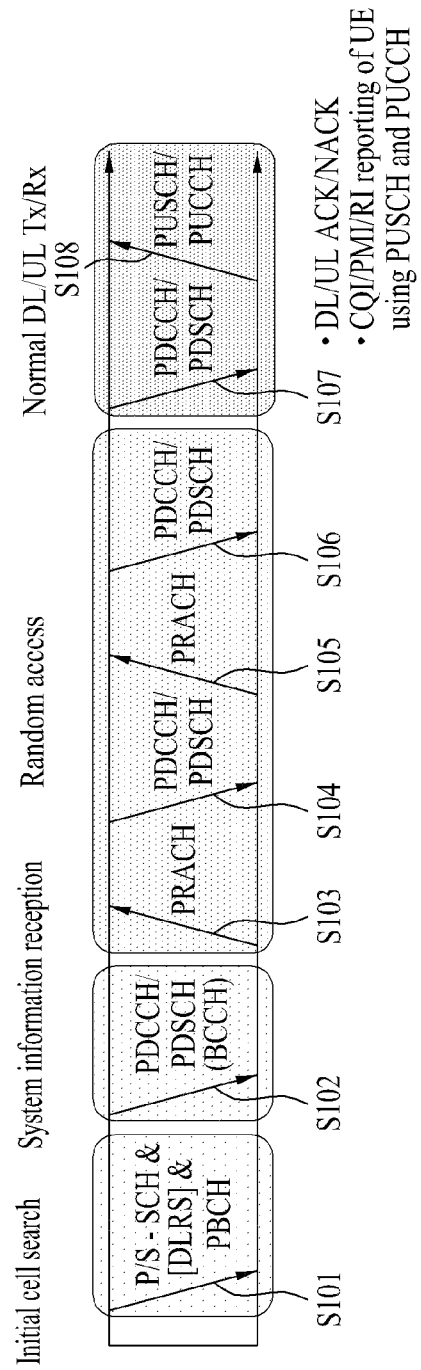
FIG. 3 illustrates physical channels used in a 3GPP system and a general signal transmission method using the same.

FIG. 3 is a diagram illustrating physical channels used in a 3GPP system and a general signal transmission method using the same.

When a UE is powered on or enters a new cell, the UE performs initial cell search such as synchronization acquisition with an eNB in step S301. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the eNB. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PUCCH) signal (step S308) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indicator (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 4:
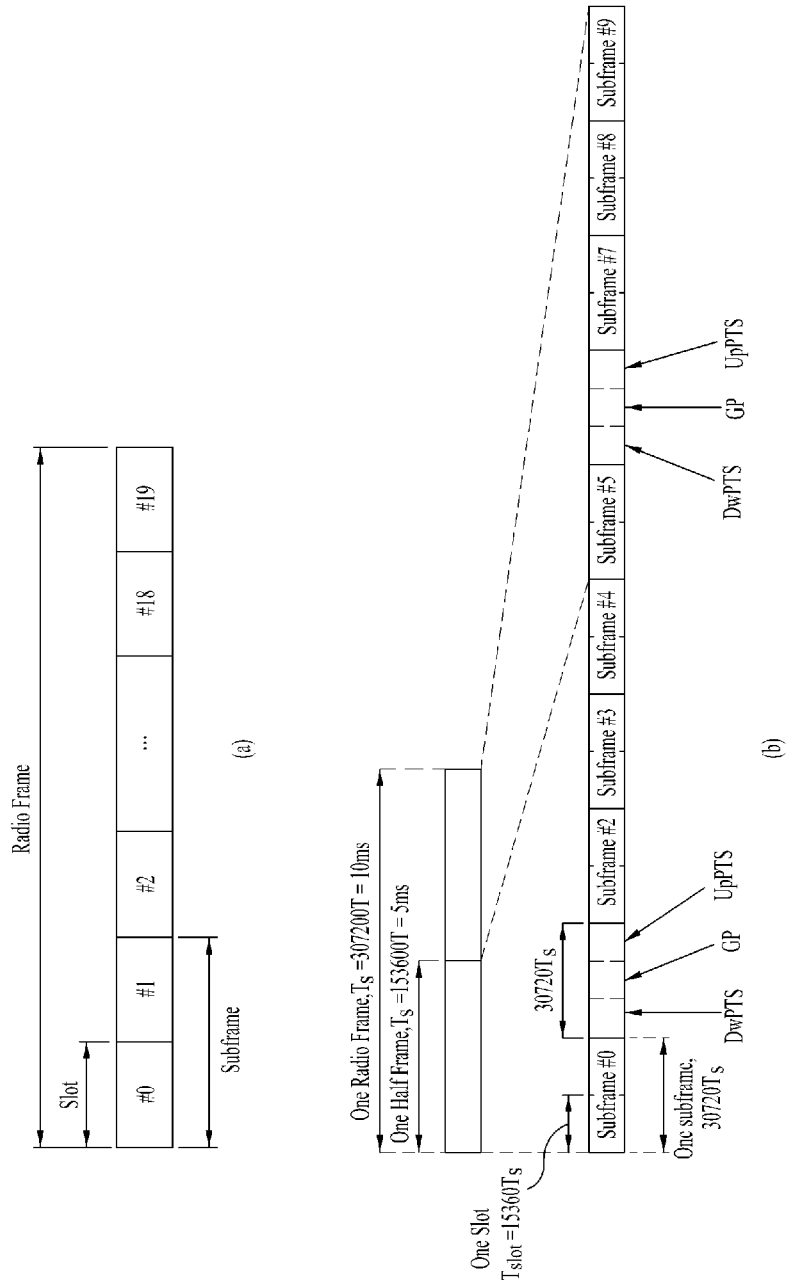
FIG. 4 illustrates the structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4($a$) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 4($b$) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $T_s=1/(15000\times2048)$. The remaining region except for a DwPTS and an UpPTS is set as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, the type 2 radio frame structure, that is, UL/DL subframe configurations in a TDD system are listed in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

The above-described structures of radio frames are purely exemplary. Accordingly, the number of subframes in a radio frame, the number of slots in a subframe, and the number of symbols in a slot may be changed in various manners.

Figure 5:
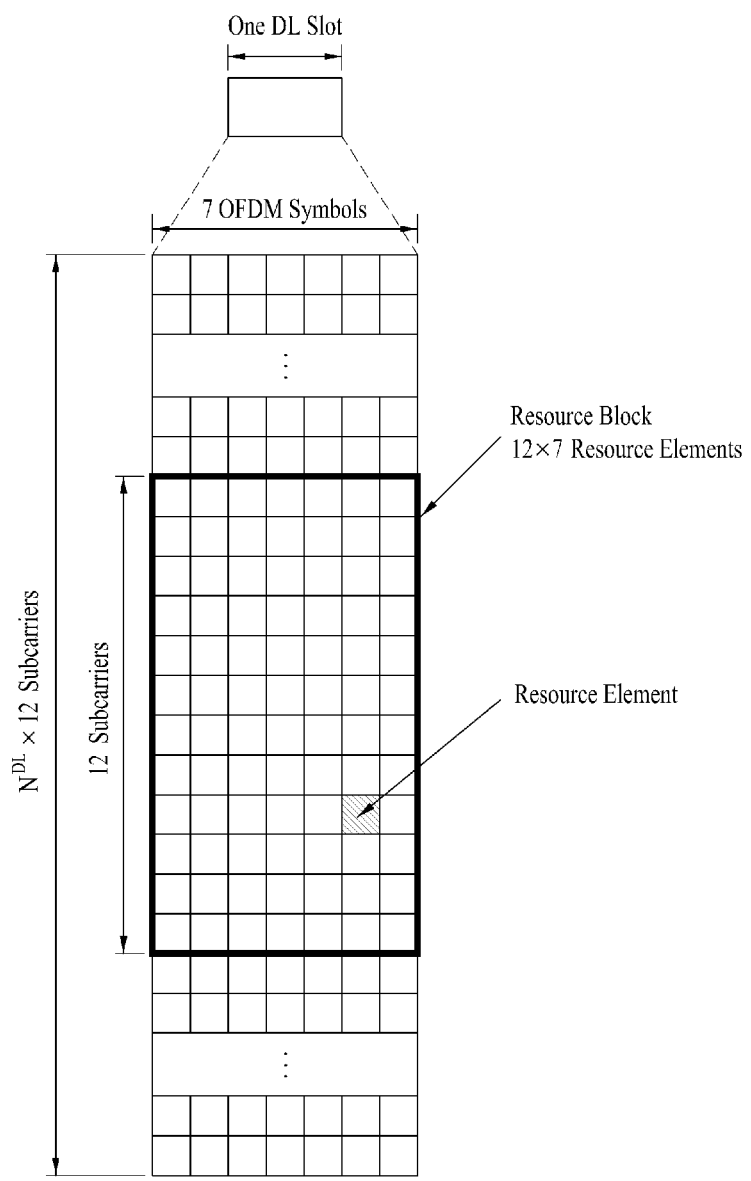
FIG. 5 illustrates a resource grid of a DL slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
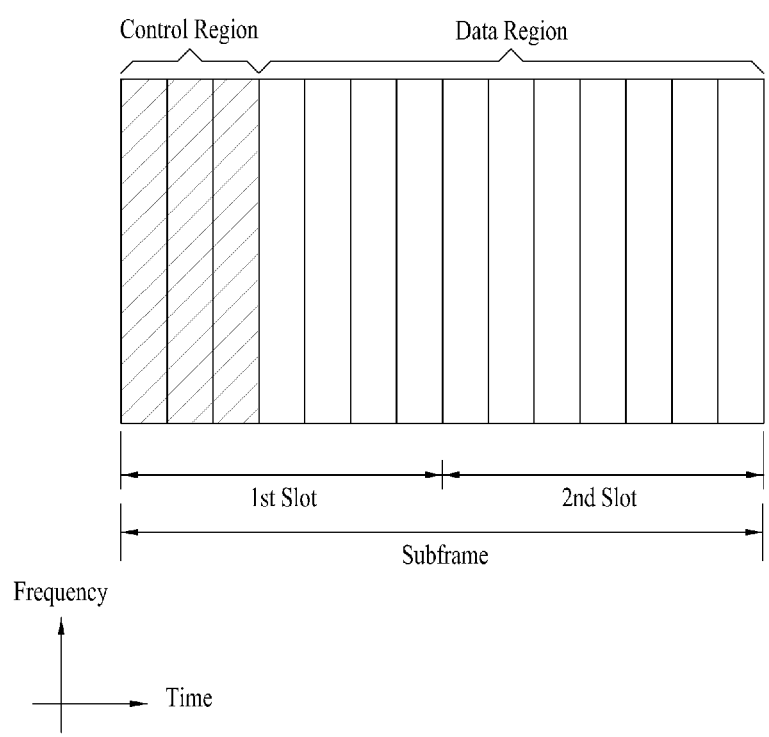
FIG. 6 illustrates the structure of a DL subframe.

FIG. 6 illustrates the structure of a DL subframe.

Referring to FIG. 6, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 7:
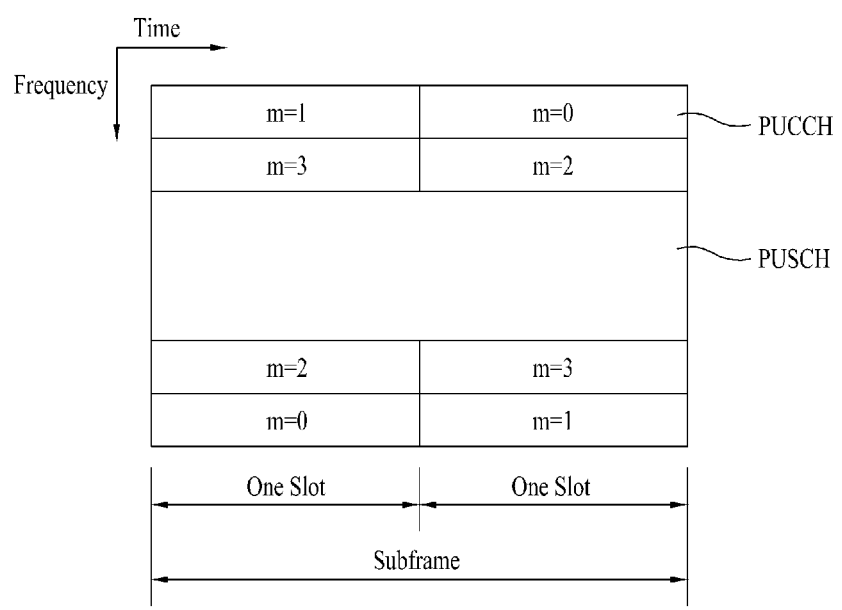
FIG. 7 illustrates the structure of a UL subframe in an LTE system.

FIG. 7 illustrates the structure of a UL subframe in an LTE system.

Referring to FIG. 7, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.

SR: SR is information requesting UL-SCH resources and is transmitted using on-off keying (OOK).

HARQ ACK/NACK: HARQ ACK/NACK is a response signal to a DL data packet received on a PDSCH, indicating whether the DL data packet has been received successfully. 1-bit ACK/NACK is transmitted as a response to a single DL codeword and 2-bit ACK/NACK is transmitted as a response to two DL codewords.

CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except for SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

Hereinafter, cooperative multipoint transmission/reception (CoMP) will be described.

A system after LTE-A has attempted to introduce a scheme for raising system performance by enabling cooperation among a plurality of cells. Such a scheme is called CoMP. CoMP refers to a scheme for two or more eNBs, access points, or cells to cooperatively communicate with a specific UE for smooth communication between the UE and the eNBs, access points, or cells. In the present invention, eNB, access point, and cell may have the same meaning.

Figure 8:
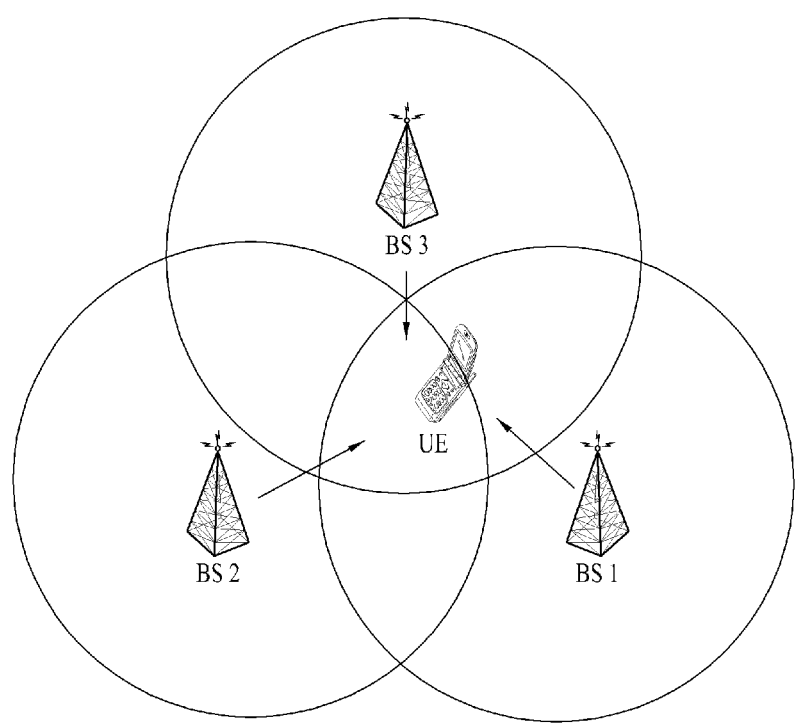
FIG. 8 illustrates an example of performing CoMP.

FIG. 8 illustrates an example of performing CoMP. Referring to FIG. 8, a radio communication system includes a plurality of BSs BS1, BS2, and BS3 that perform CoMP and a UE. The BSs BS1, BS2, and BS3 for performing CoMP may efficiently transmit data to the UE through cooperation. CoMP may be broadly divided into two schemes:

Joint processing (CoMP joint processing: CoMP-JP)

CoMP-coordinated scheduling/beamforming (CoMP-CS)

In the case of CoMP-JP, data is simultaneously transmitted from eNBs performing CoMP to one UE and the UE combines signals received from the eNBs to improve reception performance. In the case of CoMP-CS, data is transmitted to one UE through one eNB at an arbitrary time and scheduling or beamforming is performed such that interference caused by other eNBs may be minimized.

As a CoMP scheme, an (asymmetric) carrier aggregation (CA) scheme, and a MIMO scheme supporting 8 DL transmit antennas have been introduced in LTE-A, which is recently being discussed, a method for dynamically change use of a radio resource according to radio communication states of individual cells is needed.

Accordingly, the present invention proposes a method for supporting an efficient UL or DL communication operation of a UE by informing the UE of information related to radio resource use when a radio resource (e.g. a UL resource or DL resource) is dynamically changed to be used for DL or UL communication according to change in a traffic state. In the present invention, change in use of a radio resource may be defined as "use of a radio resource for purposes other than use indicated in UL-DL configuration derived from system information block (SIB) information" or "change in use of a radio resource for purposes other than use configured at prior timing (based on a preconfigured radio resource use change period)".

For example, in a situation in which communication points (e.g. transmission points (TPs) or reception points (RPs)) performing CoMP dynamically change use of a radio resource according to traffic state, when a UE is to perform UL or DL communication with a communication point other than an existing communication point for various reasons (e.g. movement of the UE, deterioration of channel state (CSI/radio resource measurement (RRM)/radio link monitoring (RLM)) between the existing communication point and the UE, or improvement of channel state (CSI/RRM/RLM) between a new communication point and the UE), the UE needs to receive resource use configuration information from the communication point performing new communication.

Figure 9:
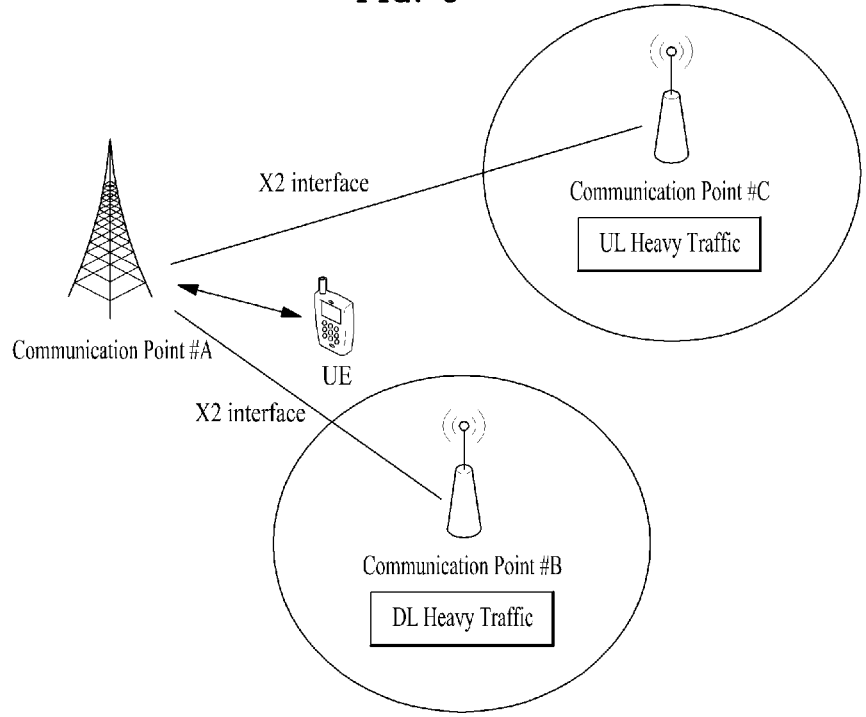
FIG. 9 illustrates problems when communication points participating in CoMP dynamically change use of a radio resource according to a system traffic state.

FIG. 9 illustrates the case in which communication points participating in CoMP dynamically change use of a radio resource according to system traffic state.

It is assumed in FIG. 9 that physical IDs (or virtual IDs) of communication points participating in CoMP are the same (e.g. CoMP scenario #4) and that the UE reports information about reference signal received power (RSRP) of each communication point participating in CoMP to communication point #A performing UL communication.

An RS used for RSRP measurement of the UE may be configured as a cell-specific RS (CRS), a CSI-RS, or a demodulation RS (DM-RS) and it is assumed that communication point #A is configured based on the CRS and communication point #B and communication point #C are configured based on the CSI-RS. Furthermore, CSI-RS configuration of communication point #B and communication point #C may be implemented based on independent (or different) antenna ports or may be implemented based on virtual IDs (or physical IDs) allocated to the respective communication points.

A specific communication point performing DL communication may inform the UE of information about an RS used for RSRP measurement of each communication point through a higher layer signal or a physical layer signal. Communication point #A may inform the UE of information as to which communication point is (will be) used to perform UL or DL communication through a higher layer signal or physical layer signal, based on RSRP information for each communication point reported by the UE.

In an embodiment of a TDD system of FIG. 9, it is assumed that UL-DL configuration based on SIB information is "DSUUDDSUUD" according to UL-DL configuration #1 of the above Table 2. In this case, it is assumed that communication point #A uses UL-DL configuration #1 based on a legacy SIB without changing use of a radio resource. In a situation in which demand for DL communication is increased in a system, communication point #B may change existing UL radio resources SF #(n+3) and SF #(n+8) to be used for DL communication. On the other hand, communication point #C may change existing DL radio resources SF #(n+4) and SF #(n+9) to be used UL communication in the case in which demand for UL communication is increased in the system.

An embodiment of an FDD system of FIG. 9 illustrates the case in which communication points dynamically change an existing UL or DL frequency resource configured based on SIB information according to traffic state. For example, communication point #A uses a legacy (SIB based) UL/DL frequency resource without any change, communication point #B changes a legacy UL frequency resource to a resource for DL communication due to increase in demand for DL communication in a system, and communication point #C changes a legacy DL frequency resource to a resource for UL communication due to increase in demand for UL communication in a system.

FIG. 9 illustrates an example of dynamically using a radio resource by a plurality of communication points, under the assumption that a radio resource use change period of each communication point is set to 10 ms and information about radio resource use (e.g. a bitmap for radio resource use) configured per communication point for a CoMP operation between communication points is shared and updated through an X2 interface or a preset specific radio channel.

FIG. 10 is a diagram for explaining an example of performing UL or DL communication with a communication point other than an existing communication point when the position of a UE is changed.

Referring to FIG. 10(a), communication point #A that has communicated with the UE may inform the UE that the UE may perform UL or DL communication with communication point #B because the RSRP of communication point #B reported from the UE is highest. Referring to FIG. 10(b), communication point #A may inform the UE that the UE may perform UL or DL communication with communication point #C because the RSRP of communication point #C reported from the UE is highest. That is, the UE may perform UL or DL communication with a newly configured communication point based on information received from an existing communication point (i.e. communication point #A).

Further, a UL communication point of the UE and a DL communication point of the UE may be differently configured. For example, a communication point having the lowest value based on pathloss measurement information between the communication point and the UE may be configured as the UL communication point and a communication point having the highest RSRP may be configured as the DL communication point.

The present invention proposes a method for a UE to perform UL or DL communication with a communication point other than an existing communication point that has performed communication, for various reasons (e.g. movement of the UE, deterioration of channel state (CSI/RRM/RLM) between the existing communication point and the UE, or improvement of channel state (CSI/RRM/RLM) between a new communication point and the UE) in a situation in which communication points participating in CoMP dynamically change use of a radio resource according to (system) traffic state.

The present invention described hereinafter is applicable even to a situation in which communication is performed based on a 'legacy PDCCH' or an 'enhanced-PDCCH (EPDCCH)' transmitted in a PDSCH region instead of the legacy PDCCH'. A DM-RS (or CSI-RS) based transmission/reception operation rather than a legacy CRS based transmission/reception operation may be performed on the EPDCCH. A common search space (CSS) may be present or absent in an EPDCCH region (e.g. a UE-specific search space (USS) is present).

In the present invention, a PDSCH region is defined as a region including OFDM symbols except for some of front OFDM symbols used for PDCCH transmission in a subframe (SF) including a plurality of OFDM symbols. The present invention may be applied even to the case in which all OFDM symbols of a subframe are designated and used as the PDSCH region due to absence of OFDM symbols used for PDCCH transmission (or due to absence of a PDCCH region caused by non-transmission of an RS (e.g. CRS) used for PDCCH decoding).

The term communication point used in this specification refers to not only physical hardware (e.g. an eNB, a remote radio head (RRH), or a relay) through which a transmission/reception operation is performed but also to a component carrier (CC) or cell in a CA environment.

The term radio resource used in the present invention defines a normal time/frequency resource used for radio communication and may represent, for example, a specific CC or a specific cell in a CA environment.

In the present invention, when a UE performs UL or DL communication with a newly configured communication point other than an existing communication point for various reasons (e.g. movement of the UE, deterioration of channel state (CSI/RRM/RLM) between the existing communication point and the UE, or improvement of channel state (CSI/RRM/RLM) between the new communication point and the UE) in the case in which communication points participating in CoMP dynamically change use of a radio resource according to (system) traffic state thereof, the existing communication point may inform the UE of information about other communication points (that are to perform communication with the UE) through a higher layer signal or a physical layer signal.

Figure 11:
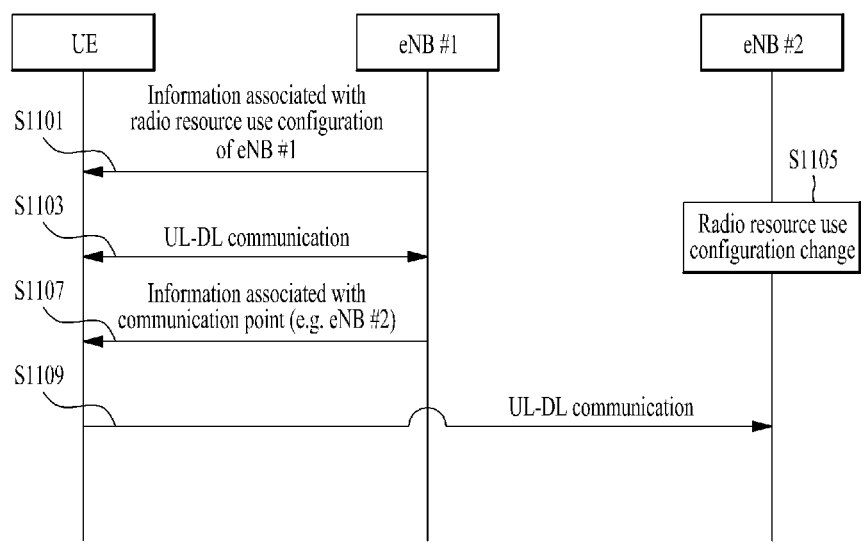
FIG. 11 is a flowchart illustrating an operation of a UE for receiving information related to a communication point from an eNB according to the present invention.

FIG. 11 is a flowchart illustrating an operation of a UE for receiving information related to a communication point from an eNB according to the present invention.

The UE receives information associated with radio resource use configuration from a serving eNB (eNB #1) (S1101). The information associated with radio resource use configuration may include information about communication directions (e.g. UL communication or DL communication) for a plurality of SFs configured based on UL-DL configuration in the case of a TDD system and information about a UL frequency band and a DL frequency band in the case of an FDD system.

The UE performs UL communication or DL communication with the serving eNB using the information associated with radio resource use configuration (S1103).

When the UE performs UL-DL communication with the serving eNB, another communication point (e.g. eNB #2) may change radio resource use configuration (e.g. from UL communication to DL communication) according to system traffic state (S1105).

If it is desirable that the UE perform DL-UL communication with a communication point other than the serving eNB (eNB #1) due to movement of the UE (or deterioration of channel state (CSI/RRM/RLM) between the serving eNB (eNB #1) and the UE or improvement of channel state (CSI/RRM/RLM) between another communication point (e.g. eNB #2) and the UE), the serving eNB (eNB #1) transmits information about the other communication point (e.g. a neighboring eNB or eNB #2) to the UE (S1107).

The UE performs UL-DL communication with another communication point (e.g. eNB #2) based on the information about the communication point received from the serving eNB (S1109).

The information about the communication point transmitted to the UE may first be received by an existing communication point from another communication point through an X2 interface or a predetermined radio channel and then the existing communication point may inform the UE of the information. In this case, another communication point may have the same physical ID as the existing communication point or a different physical ID from the existing communication point. The present invention may be applied even to the case in which a virtual ID rather than a physical ID is used.

The present invention is applicable not only to a situation in which use of a radio resource (e.g. time resource) is dynamically changed in a TDD system but also to a situation in which use of an existing radio resource (e.g. frequency resource) used as UL or DL in an FDD system is dynamically changed (e.g. band swapping operation) according to system traffic.

In the present invention, the information about the communication point may include information about radio resource use configuration of a specific communication point. For example, the information about radio resource use configuration may include at least one of basic (i.e. prior to change of use) radio resource use configuration information of the specific communication point (e.g. radio resource use configuration information of the specific communication point on an SIB), radio resource use information configured through dynamic radio resource use change, dynamic radio resource use change period information, information about a radio resource (candidate) position at which radio resource use change is performed, information about a radio resource position for fixed use (or static use or semi-static use) (e.g. for specific RS based channel information measurement (or RSRP measurement for generating channel information), specific RS based RRM/RLM measurement use, or (external) interference measurement use), special subframe configuration information or CP configuration information of the specific communication point, or MBSFN configuration information of the specific communication point.

In addition, the information about the communication point may also include information for data or control channel multiplexing (additionally) used in a specific communication point. For example, as information for efficient data or control channel multiplexing between UEs performing CoMP and UEs performing non-CoMP, the information about the communication point may include one of a virtual ID, an antenna port number (or the number of antenna ports), a scrambling (sequence) parameter, transmission mode information, and indicator (or parameter) information for equalizing a sequence group hopping pattern, a sequence hopping pattern, or a CS hopping pattern and may also include parameter information for determining whether sequence group hopping, sequence hopping, or CS hopping is applied.

In addition, the information about the communication point may include information about a control channel type and configuration in a specific communication point (e.g. legacy PDCCH based operation or EPDCCH based operation).

When the specific communication point performs the EPDCCH based operation, the information about the communication point may include information about an EPDCCH. That is, the information about the communication point may include search space (SS) (e.g. CSS or USS) configuration information for the EPDCCH, resource configuration information for an SS for the EPDCCH, special subframe configuration information affecting determination of a minimum aggregation level (AL) and the amount of resources constituting one enhanced CCE (ECCE), CP configuration information, MBSFN configuration information, system bandwidth size information, or RS configuration information (e.g. antenna port number, the number of antenna ports, scrambling sequence parameter, etc.).

The information about the communication point may include information about interference cancellation applied by a specific communication point (e.g. a transmitting (Tx)-side rate matching method and a receiving (Rx)-side puncturing or Rx-side interference cancellation method).

According to the present invention, the information about the communication point transmitted to the UE is efficient especially when the UE changes a communication point which has performed UL or DL communication for various reasons (e.g. movement of the UE, deterioration of channel state (CSI/RRM/RLM) between an existing communication point and the UE, or improvement of channel state (CSI/RRM/RLM) between a new communication point and the UE) in a situation in which communication points having the same physical ID perform CoMP (e.g. CoMP scenario #4). This is because the UE may regard the above-described change of the communication point as an SS reconfiguration operation of the EPDCCH if (all or new) communication points have performed the EPDCCH based operation.

If the UE performs UL or DL communication with (new) another communication point participating in CoMP other than an existing communication point for various reasons (e.g. movement of the UE, deterioration of channel state (CSI/RRM/RLM) between the existing communication point and the UE, or improvement of channel state (CSI/RRM/RLM) between a new communication point and the UE), the present invention can efficiently support the UE so that the UE rapidly resumes communication with another (new) communication point. For example, the UE receives information about a specific communication point from the existing communication point and then performs UL or DL communication with another (new) communication point based on the received information.

As described above, the present invention may be applied not only to the case in which physical IDs (or virtual IDs) of communication points performing CoMP are equal but also to the case in which physical IDs (or virtual IDs) of communication points performing CoMP are different. Additionally, an existing communication point or a neighboring communication point (to be handed over) may inform the UE of the information about the communication point proposed by the present invention together with information necessary for a handover operation even when the UE performs a handover operation between communication points.

The present invention is applicable to the case of sharing information about a radio resource (candidate) position to be statically or semi-statically changed as well as the case of sharing information about radio resource candidates having a high probability of changing use of a radio resource between communication points. According to the present invention, static and semi-static information change schemes may be combined such that information about a specific radio resource (candidate) position may be statically changed and information about the other radio resource (candidate) positions may be semi-statically changed. The present invention may also be applied to the case in which a resource use change for each CC or each cell is independently performed (based on a preset period) in a CA environment.

According to the present invention, the UE performing a CoMP based operation may pre-configure a communication direction such as UL or DL communication at specific timing (or time duration) based on radio resource use configuration information of a serving eNB thereof. However, when some or all communication points participating in CoMP dynamically change use of a radio resource according to (system) traffic states thereof, it may be difficult to efficiently use the radio resource because communication directions of the respective communication points at specific timing (or time duration) are not equal.

For example, it is assumed that a serving eNB (e.g. TP#A) of the UE performing the CoMP based operation (re-)configures a radio resource at specific timing (or time duration) to be used for UL communication, whereas another communication point (e.g. TP#B) participating in CoMP (re-)configures a radio resource at the specific timing (or time duration) to be used for DL communication. If the UE pre-configures a communication direction at the specific timing (or time duration) based on radio resource use configuration information of the serving eNB (TP#A), DL communication based on the other communication point (TP#B) cannot be performed at the specific timing and thus the radio resource may be wasted.

Accordingly, the present invention proposes a method for supporting efficient CoMP of the UE when some or all communication points participating in CoMP dynamically change use of a radio resource according to (system) traffic state.

The present invention is applicable to the case in which only communication points except for a serving eNB of the UE performing a CoMP based operation dynamically change use of a radio resource, the case in which all communication points participating in CoMP dynamically change use of the radio resource, or the case in which a radio resource use change period per eNB is configured. In addition, the present invention is also applied not only to the case in which radio resource use change periods of eNBs are equal but also to the case in which the radio resource use channel periods of eNBs are different.

The present invention may be applied to a situation in which EPDCCH based UL/DL communication is performed (e.g. when a common EPDCCH SS resource region of communication points participating in CoMP is configured or when EPDCCH SS resource regions of communication points participating in CoMP are individually (independently) designated).

The embodiments of the present invention are applicable to the case in which physical IDs (or virtual IDs) of communication points performing CoMP are different as well as to the case in which the physical IDs (or virtual IDs) of communication points performing CoMP are equal.

Figure 12:
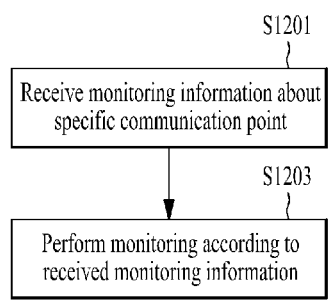
FIG. 12 illustrates a method for receiving control information from a neighboring communication point according to the present invention.

FIG. 12 illustrates a method for receiving control information of a neighboring communication point according to the present invention.

The present invention is based on the assumption that some or all communication points participating in CoMP dynamically change use of a radio resource according to each (system) traffic state. A serving eNB of a UE performing a CoMP based operation may inform the UE of monitoring information through signaling exchange between the communication points so that the UE receives control information from a specific communication point (S1201).

For example, the eNB may inform the UE of information about timing at which blind decoding (BD) is performed to receive the control information or timing at which DL control/data information is actually transmitted from the eNB (or timing at which DL control/data information may be transmitted from the eNB), as the monitoring information. Further, the monitoring information of the present invention may be configured to be indicated without complete linkage with radio resource use configuration information (or UL-DL subframe configuration information) of a specific communication point.

The UE performs monitoring for detecting the control information according to the received monitoring information (S1203). For example, the UE may perform a BD operation for receiving the control information (or DL data reception operation from the eNB) at corresponding timing (or time duration) according to the monitoring information although a radio resource at specific timing (or in a timing duration) is (re-)configured to be used for UL communication according to radio resource use configuration information of the serving eNB. While the radio resource use configuration information is exemplified as the monitoring information in the above-described example, the present invention may apply the same scheme even when the UE receives UL-DL subframe configuration information.

Timing at which a BD operation for receiving the control information of the UE included in the monitoring information of the present invention is performed (or timing at which DL data information transmission is actually performed or timing at which DL data information transmission may be performed) may include "timing at which radio resources of the serving eNB and other communication points are (re-)configured to be used for DL communication", "timing at which a radio resource of the serving eNB is (re-)configured to be used for UL communication and a radio resource of some communication points is (re-)configured to be used for DL communication" or "timing at which a radio resource of the serving eNB is (re-)configured to be used for DL communication and a radio resource of some communication points is (re-)configured to be used for UL communication".

The serving eNB may inform the UE of the monitoring information of the present invention through a predefined higher layer signal or physical layer signal. Then, the UE may receive the monitoring information and perform the BD operation for receiving the control information (or DL data reception operation, for example, transmission-reception switching operation) (at timing indicated by the monitoring information).

According to the present invention, the serving eNB of the UE performing a CoMP based operation may inform the UE of UL-DL subframe configuration information per communication point through signal exchange between communication points and cause the UE to be aware of timing at which the BD operation for receiving the control information is performed (or timing at which DL control/data information is actually transmitted from the eNB or timing at which the DL control/data information may be transmitted from the eNB), based on a predefined rule.

For example, upon receiving the UL-DL subframe configuration information per communication point from the serving eNB, the UE may be configured to perform the BD operation for receiving control information (or DL data reception operation from the eNB) at a timing point which is a union of DL subframes (or intersection of DL subframes). Desirably, the serving eNB may inform the UE of the UL-DL subframe configuration information for each communication point of the present invention through a predefined higher layer signal or physical layer signal.

The present invention is also applicable to the case in which (some or all) EPDCCH SSs of communication points participating in CoMP are independently (or differently) configured and UL-DL subframe configuration per communication point is provided.

Only some communication points, a radio resource of which is configured to be used for DL communication at specific timing (or time duration), (or only a specific communication point among some communication points, a radio resource of which is configured to be used for DL communication) among communication points participating in CoMP may perform EPDCCH transmission at the specific timing. Accordingly, in consideration of characteristics of changing the number of communication points capable of performing EPDCCH transmission according to timing (time), the present invention may be configured such that a resource region for a predefined SS (of another communication point in which EPDCCH transmission is not performed at specific timing) is additionally (re-)used together with a resource region for an SS of a communication point actually performing EPDCCH transmission at the specific timing.

In other words, according to the present invention, control information can be efficiently transmitted by causing the UE to effectively (re-)use a resource region for an SS reserved for communication points incapable of actually performing EPDCCH transmission at specific timing (e.g. when a radio resource of the specific timing is configured to be used for UL communication). Desirably, the serving eNB may inform the UE of information about a resource region for an additionally (re-)usable EPDCCH SS at the specific timing through a predefined higher layer signal or physical layer signal.

According to the present invention, UL-DL subframe configuration of each communication point participating in CoMP may be linked to a predefined virtual cell ID (or physical cell ID) per communication point or a CRS rate-matching (RM) pattern (or non-zero power CSI-RS RM pattern, zero power CSI-RS RM pattern, or quasi-co-location (QCL) information) per communication point. When a plurality of communication points participating in CoMP using the CRS RM pattern per communication point performs CRS transmission, an influence of CRS interference between different communication points can be relieved. That is, a specific communication point that actually transmits DL data may perform data transmission using a resource region except for a resource region in which CRS transmission is performed (e.g. REs or OFDM symbols used for CRS transmission) of other communication points. Accordingly, when different communication points actually transmit DL data, the UE may be aware that different CRS RM patterns are applied. Desirably, the eNB may inform the UE of predefined virtual cell ID information (or CRS RM pattern) per communication point and UL-DL subframe configuration information linked to the virtual cell ID information through a higher layer signal or a physical layer signal.

The UE receives control information including a predefined indicator (e.g. an SCID information transmission field in DCI format 2C or a PDSCH RE mapping information and QCL indicator information transmission field (i.e. PQI field) in DCI format 2D) at specific timing through a physical control channel. The UE may be aware of a virtual cell ID (or CRS RM pattern) used for data information transmission and communication point information (e.g. a physical cell ID, a virtual cell ID, non-zero power CSI-RS configuration information, or zero power CSI-RS configuration information) for actually performing data information transmission in linkage with the virtual cell ID (based on a preset rule) or UL-DL subframe configuration information of a corresponding communication point. While the above-described example has described an application of the present invention according to virtual cell ID information, the present invention may also be identically applied to the case in which CRS RM pattern information is used.

If it is determined that control information received by the UE has an error, a data reception operation may not be performed. For example, if UL-DL subframe configuration information of a communication point linked with a virtual cell ID (or CRS RM pattern) indicated by an indicator included in DL control information (e.g. DL grant) transmitted at specific timing is configured as a UL communication direction at the specific timing, the UE may regard the DL control information as erroneous information and may not perform a related DL data reception operation.

Similarly, if UL-DL subframe configuration information at UL data transmission timing of a communication point linked with a virtual cell ID (or CRS RM pattern) indicated by an indicator in UL control information (e.g. UL grant) transmitted at specific timing is configured as a DL communication direction, the UE may regard the UL control information as erroneous information and may not perform a related UL data reception operation.

According to the present invention, when (some or all) resource region configurations for an EPDCCH SS for communication points participating in CoMP are differently defined, an efficient EPDCCH transmission/reception operation of the eNB and the UE can be performed in consideration of a different UL-DL subframe configuration per communication point at specific timing. Desirably, the eNB may inform the UE of resource region configuration information for an EPDCCH SS per communication point through a predefined higher layer signal or physical layer signal.

For convenience of description, it will be assumed hereinbelow that two communication points (i.e. TP#1 and TP#2) participate in CoMP and different resource region configurations for EPDCCH SSs (i.e. SS#1 and SS#2) of the respective communication points are designated. It will be also assumed that TP#1 at specific timing is used for DL communication and TP#2 is used for UL communication.

According to the present invention, the UE may be configured to perform a BD operation only in a predefined EPDCCH SS (SS#1) of a communication point (e.g. TP#1) used for DL communication at the specific timing. In other words, the UE does not perform the BD operation in a predefined EPDCCH SS (e.g. SS#2) of a communication point (e.g. TP#2) assuming a UL communication direction at the specific timing. The above method has a disadvantage of not completely using BD capabilities of the UE for the EPDCCH SSs (e.g. SS#1 and SS#2) of all the communication points (e.g. TP#1 and TP#2) participating in CoMP but has an advantage of lowering "false alarm probability" for control information reception.

According to the present invention, the UE may be configured to perform a BD operation for predefined EPD- CCH SSs (e.g. SS#1 and SS#2) of all communication points (e.g. TP#1 and TP#2) participating in CoMP irrespective of UL-DL subframe configurations for individual communication points at special timing. In this case, for BD for all communication points, a rule may be determined for performing a control information transmission/reception operation in an EPDCCH SS (e.g. SS#2) of a communication point (e.g. TP#2) performing UL communication at specific timing (or a BD operation for an EPDCCH SS of a communication point (e.g. TP#2) performing UL communication) by using part of parameters of a communication point (e.g. TP#1) performing DL communication at the specific timing. The part of parameters of a communication point performing DL communication may include a virtual cell ID, a physical cell ID, a CRS RM pattern, a non-zero power CSI-RS RM pattern, or a zero power CSI-RS RM pattern.

In the present invention, the UE may perform a BD operation for receiving control information only for a communication point (e.g. TP#1) performing DL communication at specific timing with the proviso that candidate resource regions of an EPDCCH SS of the corresponding communication point are extended (e.g. the number of candidate resource regions of an EPDCCH SS is increased).

According to the present invention, as a method for extending candidate resource regions of an EPDCCH SS (for increasing the number of candidate resource regions), a predefined EPDCCH SS (e.g. an RB set) for a communication point performing DL communication may be extended (or additionally increased) or a candidate resource region (position) in an EPDCCH SS may be relatively densely configured (or allocated) while the predefined EPDCCH SS for the communication point is maintained (i.e. a resource for the EPDCCH SS (e.g. an RB set) is identically configured). Desirably, the eNB may inform the UE of information about the extended (additionally increased) EPDCCH SS and information about the changed candidate resource region (position) allocation method through a predefined higher layer signal (or physical layer signal).

The additionally allocated EPDCCH SS may (re-)use a predefined EPDCCH SS (e.g. SS#2) of a communication point (e.g. TP#2) performing UL communication at corresponding timing. Accordingly, the method may be performed through re-allocation (or re-configuration) of BD capabilities of the UE and has an advantage of lowering "blocking probability" for control information transmission.

In the present invention, when an existing UL radio resource is changed to be used for DL communication, a CRS of all regions or a specific region (e.g. a CRS in a control information transmission region or a CRS in a data information transmission region) may not be transmitted, a control information channel of an existing PDCCH form may not be transmitted, or an MBSFN subframe based operation may be performed, in a corresponding DL radio resource region.

Alternatively, the eNB may designate a DL radio resource region, use of which is changed, to the UE in the form of the MBSFN subframe under the assumption that the CRS is transmitted in a radio resource region for DL use. However, if a signal for configuring an existing MBSFN subframe is reused, since a legacy UE may judge that an SIB based UL subframe is configured as an MBSFN subframe for DL communication, operation of the legacy UE may be problematic. Accordingly, the present invention may define an additional higher layer signal or physical layer signal for operating a use-changed DL radio resource region in the form of the MBSFN subframe.

The embodiments of the present invention are applicable to the case in which specific CC based CoMP is performed in a CA environment or the case in which use of a radio resource is dynamically changed on a specific CC. While the embodiments of the present invention may be independently implemented, they may also be implemented in combination form. The present invention may define a rule for limitedly applying the embodiments thereof only when a dynamic change mode of a radio resource is configured.

Figure 13:
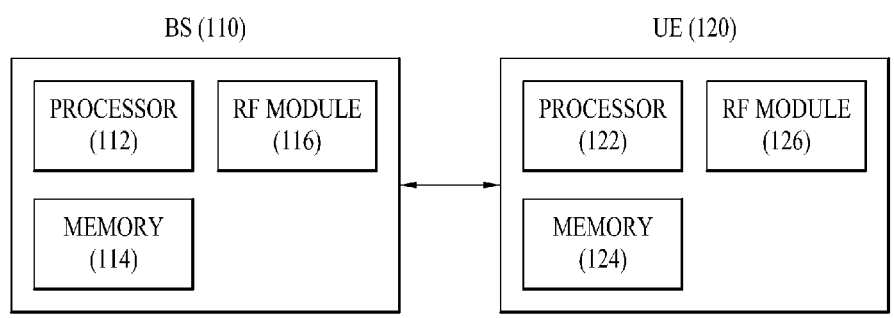
FIG. 13 illustrates a BS and a UE that are applicable to an embodiment of the present invention.

FIG. 13 illustrates a BS and a UE that are applicable to an embodiment of the present invention. If a wireless communication system includes a relay, communication in a backhaul link is performed between the BS and the relay and communication in an access link is performed between the relay and the UE. Accordingly, the BS or the UE shown in FIG. 13 may be replaced with the relay according to situation.

Referring to FIG. 13, a wireless communication system includes a BS 110 and a UE 120. The BS 110 includes a processor 112, a memory 114, and a Radio Frequency (RF) unit 116. The processor 112 may be configured to perform the proposed procedures and/or methods according to the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method for receiving a DL signal in a wireless communication system and the apparatus therefor have been described centering on an example applied to a 3GPP LTE system, the present invention is applicable to a variety of wireless communication systems in addition to the 3GPP LTE system.

The invention claimed is:

1. A method for receiving a downlink signal by a user equipment in a wireless communication system supporting coordinated multi-point transmission and reception (CoMP), the method comprising:
receiving monitoring information related to a neighboring cell operating according to a second uplink (UL)-downlink (DL) configuration from a serving cell operating according to a first UL-DL configuration,
wherein the monitoring information indicates a resource region for an enhanced physical downlink control channel (EPDCCH) of the neighboring cell; and
when the resource region for the EPDCCH of the neighboring cell is configured, detecting control information via only the resource region for the EPDCCH based on the monitoring information,
wherein the resource region for the EPDCCH is extended by reallocating a blind decoding capability of the UE,
wherein at least one of the first UL-DL configuration and the second UL-DL configuration is obtained by changing part of radio resources according to a predetermined specific UL-DL configuration.

2. The method according to claim 1, wherein the monitoring information is information related to timing at which the neighboring cell transmits a DL signal.

3. The method according to claim 1, wherein the monitoring information is information related to timing at which DL communication is simultaneously configured for the serving cell and the neighboring cell.

4. The method according to claim 1, wherein the monitoring information is information related to a cell-specific reference signals rate matching (CRS-RM) pattern configured for the neighboring cell.

5. The method according to claim 1, wherein the neighboring cell is a cell having a minimum pathloss value for the user equipment.

6. The method according to claim 1, wherein the neighboring cell is a cell having a highest reference signal received power for the user equipment.

7. The method according to claim 1, wherein a physical identifier (ID) of the serving cell is the same as a physical ID of the neighboring cell.

8. The method according to claim 1, wherein the neighboring cell is determined based on a reference signal received power or pathloss measurement information.

9. A user equipment for receiving a downlink signal in a wireless communication system supporting coordinated multi-point transmission and reception (CoMP), the user equipment comprising:
a radio frequency (RF) unit; and
a processor, wherein the processor is configured to:
receive monitoring information related to a neighboring cell operating according to a second uplink (UL)-downlink (DL) configuration from a serving cell operating according to a first UL-DL configuration,
wherein the monitoring information indicates a resource region for an enhanced physical downlink control channel (EPDCCH) of the neighboring cell, and
when the resource region for the EPDCCH of the neighboring cell is configured, detect control information via only the resource region for the EPDCCH based on the monitoring information,
wherein the resource region for the EPDCCH is extended by reallocating a blind decoding capability of the UE, and
wherein at least one of the first UL-DL configuration and the second UL-DL configuration is obtained by changing part of radio resources according to a predetermined specific UL-DL configuration.

10. A method for transmitting an uplink signal by a user equipment in a wireless communication system supporting coordinated multi-point transmission and reception (CoMP), the method comprising:
receiving monitoring information related to a neighboring cell operating according to a second uplink (UL)-downlink (DL) configuration from a serving cell operating according to a first UL-DL configuration,
wherein the monitoring information indicates a resource region for an enhanced physical downlink control channel (EPDCCH) of the neighboring cell;
when the resource region for the EPDCCH of the neighboring cell is configured, detecting control information via only the resource region for the EPDCCH based on the monitoring information,
wherein the resource region for the EPDCCH is extended by reallocating a blind decoding capability of the UE; and
transmitting the uplink signal based on the detected control information of the neighboring cell,
wherein at least one of the first UL-DL configuration and the second UL-DL configuration is obtained by changing part of radio resources according to a predetermined specific UL-DL configuration.

11. A user equipment for transmitting an uplink signal in a wireless communication system supporting coordinated multi-point transmission and reception (CoMP), the user equipment comprising:
a radio frequency (RF) unit; and
a processor, wherein the processor is configured to:
receive monitoring information related to a neighboring cell operating according to a second uplink (UL)-downlink (DL) configuration from a serving cell operating according to a first UL-DL configuration,
wherein the monitoring information indicates a resource region information for an enhanced physical downlink control channel (EPDCCH) of the neighboring cell,
when the resource region for the EPDCCH of the neighboring cell is configured, detect control information via only the resource region for the EPDCCH based on the monitoring information,
wherein the resource region for the EPDCCH is extended by reallocating a blind decoding capability of the UE, and
transmit the uplink signal based on the detected control information of the neighboring cell, and
wherein at least one of the first UL-DL configuration and the second UL-DL configuration is obtained by changing part of radio resources according to a predetermined specific UL-DL configuration.

* * * * *